April 27, 1954     W. R. PACE ET AL     2,676,778
CLEARANCE LIGHT BRACKET
Filed May 12, 1950
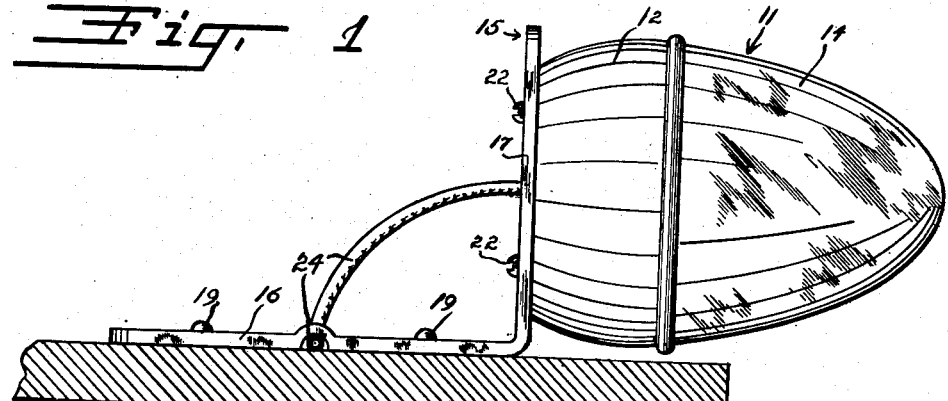
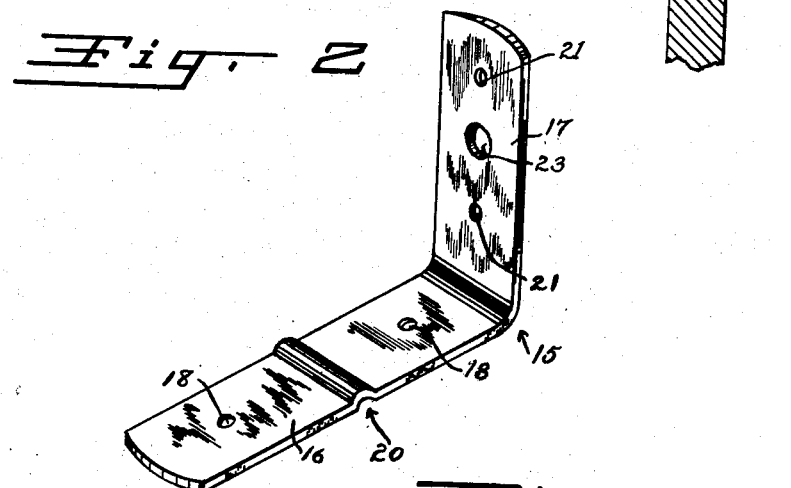
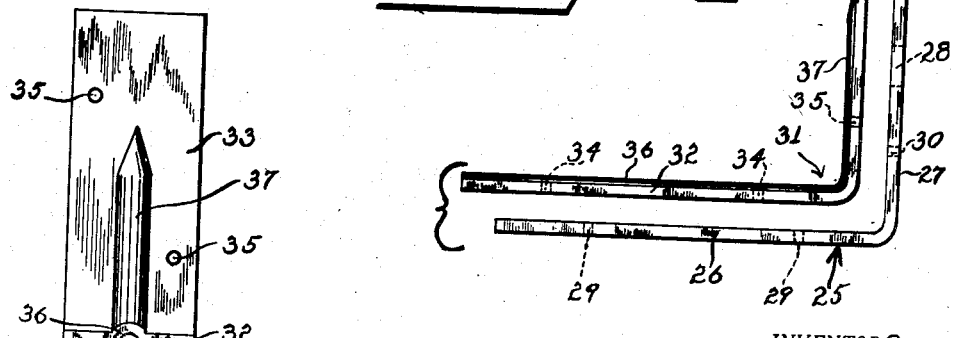
INVENTORS
Walter R. Pace
BY Paul Baysinger
Sherman Levy
ATTORNEY Patented Apr. 27, 1954

2,676,778

UNITED STATES PATENT OFFICE 2,676,778

CLEARANCE LIGHT BRACKET

Walter R. Pace, Hutchinson, and Paul Baysinger, Dodge City, Kans.

Application May 12, 1950, Serial No. 161,598

1 Claim. (Cl. 248—300)

This invention relates to lamps or lights, and more particularly to a bracket for supporting such a light on a vehicle.

The object of the invention is to provide a bracket for supporting a light, such as a clearance light, on a truck, automobile, bus, or other vehicle, the bracket being constructed so that the electric conductor wire will not be pulled loose from the clearance or other lights.

Another object of the invention is to provide a light-supporting bracket for connection to a vehicle, said bracket serving to prevent the electric conductor wire from being pulled out of engagement with the light, as usually happens when mud collects on the wire, or when an object accidentally engages the wire.

A further object of the invention is to provide a lamp bracket which is extremely simple and inexpensive to manufacture.

Other objects and advantages will be apparent during the course of the following description.

In the accompanying drawings forming a part of this application, and in which like numerals are used to designate like parts throughout the same:

Figure 1 is a side elevational view showing the light-supporting bracket of the present invention attached to a portion of a vehicle;

Figure 2 is a perspective view of the bracket of Figure 1;

Figure 3 is an exploded side elevational view showing a modified bracket assembly for use in supporting a light on a vehicle;

Figure 4 is an end elevational view of the cover bracket of the assembly of Figure 3.

Referring in detail to Figures 1 and 2 of the drawings, the numeral 10 designates a portion of a supporting body, such as an automobile, bus, truck, or other vehicle. Arranged adjacent to the portion 10 of the vehicle is a light or lamp 11, Figure 1, and the light 11 may be a clearance light mounted on the back of the vehicle. The light 11 is conventional and includes a base 12 having a transparent lens 14 mounted on its projecting end.

The numeral 15 designates an L-shaped bracket which may be fabricated of any suitable material. The bracket 15 includes a horizontally disposed leg 16 and a vertically disposed leg 17.

The horizontally disposed leg 16 is provided with a plurality of spaced openings 18, Figure 2, whereby suitable securing elements, such as screws 19, can be inserted through the openings 18 into the vehicle 10 so as to anchor or secure the bracket 15 to the vehicle. The horizontally disposed leg 16 is further provided with a transversely extending channel or arcuate portion 20 for a purpose to be later described.

The vertically disposed leg 17 is provided with a plurality of spaced openings 21, and suitable securing elements, such as screws 22, are adapted to be inserted through the openings 21 and into engagement with the base 12 of the light so as to secure the light 11 to the bracket.

The vertically disposed leg 17 is further provided with an opening or hole 23, and an electric conductor wire 24 projects through the opening 23. The wire 24 is electrically connected to the light 11, and the wire 24 is adapted to be electrically connected to a suitable source of electrical energy, such as the vehicle battery. A portion of the wire 24 extends through the channel 20, so that the wire 24 will be anchored or clamped between the leg 16 and the upper portion of the body 10, whereby the wire 24 will not be accidentally pulled loose from the light 11.

Referring to Figures 3 and 4 of the drawings, the numeral 25 designates an L-shaped base plate which forms part of the bracket assembly. The base plate 25 includes a horizontally disposed leg 26 and a vertically disposed leg 27, Figure 3. The leg 27 is provided with a hole or opening 28, and a wire, such as the wire 24, is adapted to project through the hole 28. The leg 26 is provided with a plurality of spaced openings 29, while the other leg 27 is also provided with a plurality of spaced openings 30 for a purpose to be later described.

The bracket assembly of Figures 3 and 4 further includes a cover plate 31 which also has an L-shape. The cover plate 31 includes a horizontally disposed leg 32 and a vertically disposed leg 33, there being spaced openings 34 in the horizontally disposed leg 32. The other leg 35 of the cover plate 31 is provided with a plurality of spaced openings 35. The openings 34 and 35 are adapted to register with the openings 29 and 30 when the plates 31 and 25 are arranged contiguous to each other, so that suitable securing elements, such as bolt-and-nut assemblies, or screws, can be inserted through these openings to maintain the plates 31 and 25 in their assembled positions.

The horizontally disposed leg 32 of the cover plate 31 is provided with a longitudinally extending channel or arcuate section 36, while the other leg 33 of the plate 31 is also provided with a channel 37, the channel 37 communicating with the channel 36. When the plates 31 and 25 are connected together, the conductor wire 24 leading to the light passes through the opening 28, then through the channel 37, then through the channel 36, so that the conductor wire will be clamped between the cover plate 31 and the base plate 25, whereby the wire will be prevented from accidentally moving out of engagement with the light.

In using the bracket of Figures 1 and 2, the leg 17 is connected to the base 12 of the light 11 by the screws 22, and the conductor wire 24 is passed through the hole 23 in the leg 17. Then, the conductor wire 24 is passed through the channel 20 in the leg 16, and the leg 16 is secured to the vehicle 10 by the screws 19. Thus, the conductor wire 24 will be securely clamped or anchored between the leg 16 and the portion 10 of the vehicle, so that the wire 24 will not be accidentally pulled loose from the light 11 in the event that an object accidentally contacts the exposed portion of the wire 24. Also, the wire 24 will not be accidentally pulled loose from electrical contact with the light 11, even though mud, dirt and the like may be collected on the wire 24 during the normal use of the vehicle.

In Figures 3 and 4, there is shown a modified bracket assembly which is also adapted to be used for supporting a light, such as the light 11, on a supporting body, such as a vehicle. Thus, the conductor wire 24 is passed through the opening 28 in the leg 27. Then, when the cover plate 31 is positioned contiguous to the base plate 25, the wire 24 is passed through the channel 37, then through the channel 36, and the wire 24 can, of course, be electrically connected to a suitable source of electrical energy. The plates 31 and 25 are adapted to be maintained in assembled relation by means of suitable securing elements, such as screws, which can project through registering openings 35 and 30, and through registering openings 34 and 29. Thus, the conductor wire 24 will be securely anchored or clamped between the plates 31 and 25, so that the wire will not accidentally work loose from the light on the vehicle.

By means of the bracket of the present invention, the electrical wire 24 will be prevented from working loose from lights, such as clearance lights on the rear ends of vehicles, even though mud may collect on the conductor wire. Thus, the expense of constantly correcting light failures as a result of the wires being pulled loose will be eliminated. The bracket of the present invention may be installed as a permanent support for a clearance light of a vehicle. Also, the brackets of the present invention can be produced easily and inexpensively.

We claim:

As a new article of manufacture, a bracket fabricated of a single piece of material and including a horizontally disposed leg, there being a pair of spaced openings arranged in said horizontally disposed leg, a vertically disposed leg projecting upwardly from an end of said horizontally disposed leg and provided with an opening, said horizontally disposed leg being provided with a transversely extending channel, said channel being interposed between said pair of openings, said channel extending above said horizontally disposed leg to provide a lower smooth surface on said horizontally disposed leg, said vertically disposed leg being provided with a pair of apertures arranged on opposite sides of the opening therein, the openings and apertures in said legs being arranged in alignment with respect to each other.

References Cited in the file of this patent

UNITED STATES PATENTS

| Number | Name | Date |
|---|---|---|
| 1,950,250 | Kinney | Mar. 6, 1934 |
| 1,967,697 | Williams | July 24, 1934 |
| 2,122,375 | Kovac | June 28, 1938 |
| 2,230,521 | Bolser | Feb. 4, 1941 |
| 2,269,947 | Ludwig | Jan. 13, 1942 |
| 2,274,217 | Sauer | Feb. 24, 1942 |